Figure 1:
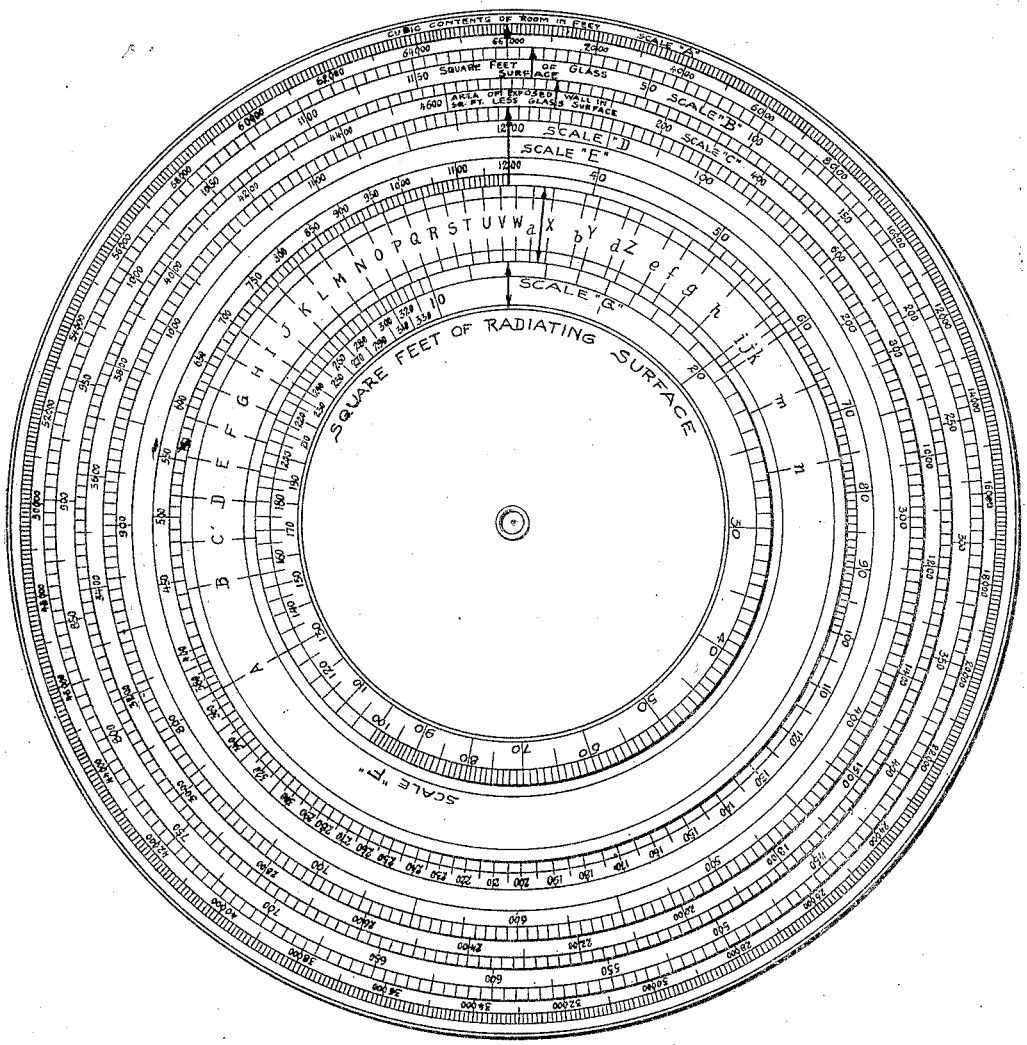

P. F. BROWN.
RADIATION CALCULATOR.
APPLICATION FILED JULY 6, 1909.

974,354.

Patented Nov. 1, 1910.
2 SHEETS—SHEET 1.

WITNESSES:

INVENTOR
Paul F. Brown
BY
ATTORNEY

P. F. BROWN.
RADIATION CALCULATOR.
APPLICATION FILED JULY 6, 1909.

974,354.

Patented Nov. 1, 1910.

2 SHEETS—SHEET 2.

WITNESSES:

INVENTOR
Paul F. Brown
BY
ATTORNEY

UNITED STATES PATENT OFFICE.

PAUL FERI E BROWN, OF HACKENSACK, NEW JERSEY, ASSIGNOR OF ONE-HALF TO MARK E. MONASH, OF NEW YORK, N. Y.

RADIATION-CALCULATOR.

974,354.  Specification of Letters Patent.  Patented Nov. 1, 1910.

Application filed July 6, 1909. Serial No. 506,201.

*To all whom it may concern:*

Be it known that I, PAUL F. BROWN, citizen of the United States of America, residing at 7 Meyer street, Hackensack, New Jersey, have invented certain new and useful Improvements in Radiation-Calculators, of which the following is a specification.

My invention relates to means for quickly determining, by mechanical operation, the required area of steam or hot water radiating surface necessary to produce in a closure a given temperature.

The principal object of the invention is to provide a radiation calculator, whereby the operations of determining the required radiating surface may be mechanically performed, obviating long and intricate mathematical calculations which are frequently subject to inaccuracies and errors.

In the preferred form illustrated in the drawing, the invention comprises a plurality of preferably concentric disks of any suitable material, each disk being properly marked and appropriated to a different character of indications. The several disks are of progressively graduating size, certain thereof being movable and certain others thereof being fixed, as will be hereinafter more fully set out and explained.

Figure 4:
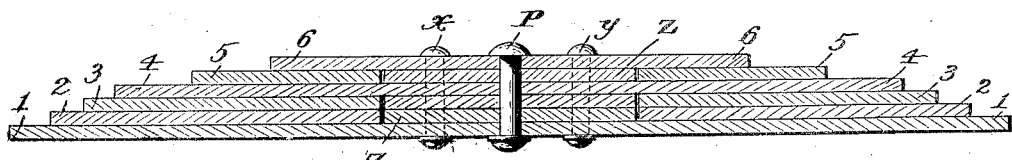
Figure 2:
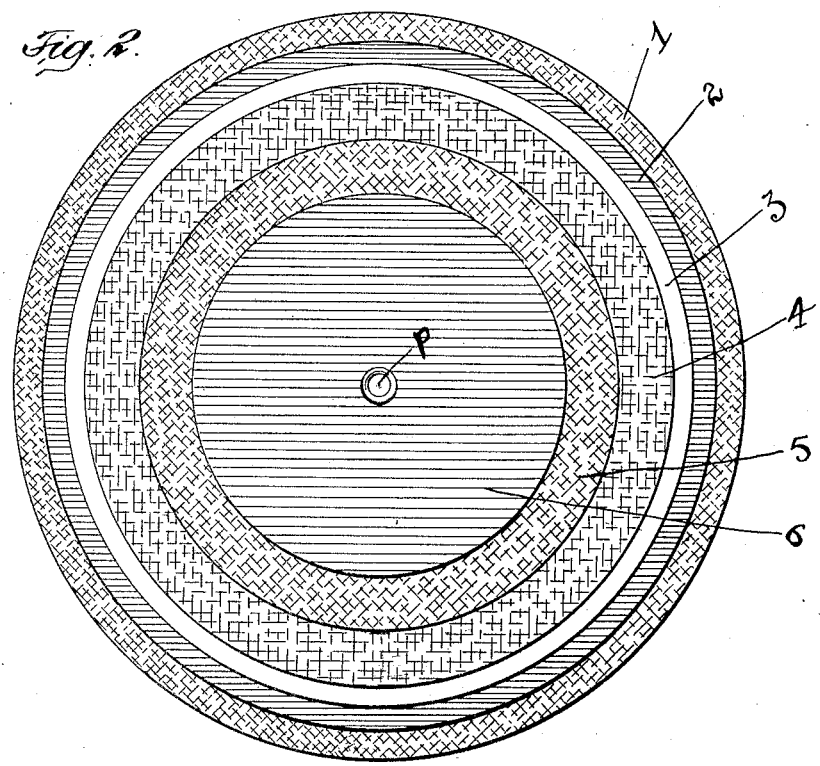
Figure 3:
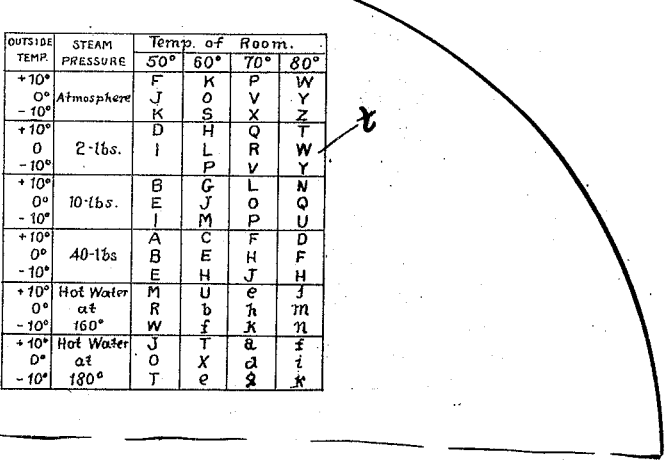

Figure 1 is a plan view of the invention in operative form; Fig. 2 is a similar view with the markings or scales omitted, this view being primarily designed to illustrate the contrasting colors of the disks; Fig. 3 is a view of a table placed on the reverse side of the calculator; Fig. 4 is a cross sectional view through Fig. 1.

Referring to the drawings, the numerals 1, 2, 3, 4, 5, and 6, indicate concentrically arranged disks preferably of contrasting colors as shown by the sectional shading in Fig. 2. The disks designated 2, 3, and 5, are revoluble about a suitable center, for example a pin $p$ defining the center of the device, while the remaining disks are fixed, and it is to be noted that the disks are of progressively decreasing diameter in their numerical order.

In Fig. 4 is shown the preferred manner of constructing my improved device. The members 1, 4 and 6 it will be noted are intact disks or round bodies, held in the same relative position through the medium of the pins or bolts $p$, $x$ and $y$ passing therethrough. The remaining disks are of annular form and are revoluble. Each of the disks 2, 3 and 5 has its center portion $z$ cut or punched out from the body of the disks, and through these centers the pins $p$, $x$ and $y$ pass thus forming a sectional built up pivot about which the revoluble disks turn, the members 1, 4 and 6 preventing the annular members 2, 3 and 5 from slipping off the device.

The disks above referred to are provided with graduations taking the form of scales, designated A, B, C, D, E, F, G, each disk bearing one scale, except disk 4 upon which scales E and F appear. Scale A, which is designed to indicate the cubic contents in feet of a closure, is marked in hundreds from 1 to 66000; scale B, which is designed to indicate the square feet of glass surface, is marked in fives from 1 to 1200; scale C, which is designed to indicate the area of an exposed wall less the square feet of glass surface therein, is marked in twenties from 1 to 4800; scale D, which is designed to show the result of the operations performed by the preceding scales, is marked in fives from 1 to 1200; scale E, to which the result obtained on the scale D is to be transferred, contains the reduction to the logarithmic scale of the markings on scale D; scale F, termed the factor scale, contains the logarithms to scale of the factors; scale G, which shows the square feet of radiating surface required is divided into the logarithms of the radiation quantities, and the table $t$ (Fig. 3) on the reverse side of the calculator, indicates the factors corresponding to various conditions of internal and external temperatures, steam pressure or hot water temperature, and the required interior temperature of the closure.

The structure of the device having been described as above, a brief description of its mode of operation will now be given. The first step to be taken in the determination of the size of radiator or radiators required is to ascertain the cubic contents of the room in feet, placing this quantity on a slip of paper for future reference. Thereafter measure the total window surface, height and width, and multiply these together to get the square feet of glass surface. If there are doors in the room which communicate directly with the outside air, add for each square foot of door surface $\frac{1}{4}$ sq. ft. of glass to the amount found above. If there are skylights of single thickness glass between the room in question and the outside air, add for each sq. ft. of skylight .95 sq. ft. of glass to the amount already found. The next step is to multiply the length of the exposed wall by the height of the room and deduct from this the amount of glass surface previously found. This result is the sq. ft. of exposed wall. Knowing the cubic contents, the area of exposed wall and glass surface, place the arrow of scale "B" (scale of glass surface) pointing to the cubic contents of the room on scale "A". Then place the arrow of scale "C" (scale of exposed wall) pointing to the number corresponding to the sq. ft. of glass surface on scale "B". Find the number on scale "C" which corresponds to the sq. ft. of exposed wall surface and read on scale "D" opposite this number the result. Transfer the result obtained on "D" to the corresponding number on scale "E" placing the arrow of scale "F" (factor scale) opposite same. Referring to the table $t$ on the reverse side of the calculator find the factor which corresponds, as to steam pressure or hot water temperature, external temperature and required room temperature, to the conditions in question. Having determined which factor meets the requirements reverse the calculator and on scale "G" (radiation scale) opposite the factor on "F" will be found the required amount of surface. If the room in question is exposed to the north, west or north-west 10% should be added to the size of the radiator obtained. For northeast and southwest exposure add 5% to the size. If the room has an unheated attic above or an unheated basement below add 15%.

The principle on which the calculator is based is that as many British thermal units (B. T. U.) are required to raise the temperature of one square foot of glass one degree as will be required to raise 55 cubic ft. of air one degree, and also that as many B. T. U. are required to raise the temperature of one sq. ft. of glass one degree as will be required to raise 4 sq. ft. of wall one degree or that glass will radiate four times as much heat as will wall construction. Hence scale A is divided into 66000 equal parts which when divided by 55 or $\frac{66000}{55}=1200$ parts which is the unit of measure assigned to the scale of glass surface and the scale "D". Therefore when the quantity 55000 on scale "A" is read this represents the cubic contents of the room but is drawn into equal $\frac{1}{55}$ of 55000 or 1000. As scale "B" (glass scale) is the unit scale this is divided into 1200 equal parts. Again scale "C" (wall scale) is divided into 4800 equal parts for the same reason that "A" was divided into 66000 parts. Scale "D" is divided into 1200 parts, so that by placing the pointer on scale "B" opposite 55000 on scale "A" and then placing the pointer on scale "C" opposite 300 on scale "B" and reading the result on "D" opposite 800 on "C" the instrument has automatically performed the following computations.

$$\frac{55000}{55}+300+\frac{800}{4}=1500$$

The result is simply a number and not square feet of glass, wall or anything else. But to obtain the amount of radiation this number must be multiplied by certain factors dependent upon the exterior, and interior temperatures and the steam pressure or temperatures of the hot water. Therefore as adding the logarithms of two numbers gives the logarithm of the product of these two numbers.

Scale "E" is the reduction to the logarithmic scale of the numbers on scale "D" and the markings on "F" are the logarithms to scale, of the factors. The scale "G" is divided into the logarithms of the radiation quantities.

Dials "A", "D", "E" are fixed in their relation to each other so that by moving "B" and "C" dials a sum may be read on "D", again dials "D", "E" and "G" having a fixed relation and being divided logarithmically the movement of the intervening dial "F" gives a product on dial "G".

Having thus described my invention, what I claim is:—

A radiation calculator adapted to mechanically perform operations of addition and multiplication, comprising six round members, three thereof being intact disks relatively immovable and the remaining three members being annular revoluble bodies each thereof having its center portion cut out, a plurality of pins passing through said cut out portion and through the relatively fixed disks whereby said centers form a sectional pivot about which the revoluble bodies turn, the lowermost fixed member having graduations to indicate the cubic contents in feet of a closure, the next adjacent revoluble member having graduations to indicate the glass surface of such closure, said last named graduations representing the quotient resulting from the division of the graduations on the first member by fifty five, the next adjacent revoluble member having graduations to represent the area of exposed wall surface in such closure, said last named graduations representing the product of multiplying the graduations on the second named member by four, the next adjacent fixed member having two sets of graduations one set corresponding to those on the second named member and being designed to indicate the sum resulting from the movement of the movable members between itself and the first mentioned fixed member; and the other set of graduations indicating the reduction to the logarithmic scale of the other graduations on the same member, the next adjacent revoluble member having graduations to correspond to the logarithm of a predetermined factor for ascertaining the required radiating surface, and the next adjacent fixed member having graduations corresponding to the logarithms of the square feet of radiating surface and being designed to indicate a product resulting from the movement of its immediately adjacent movable member.

In testimony whereof I have affixed my signature in presence of two witnesses.

PAUL FERRIE BROWN.

Witnesses:
 CLARISSA FRANCK,
 OTTO MUNK.